United States Patent
Yu et al.

(10) Patent No.: US 12,188,109 B2
(45) Date of Patent: Jan. 7, 2025

(54) STEEL MATERIAL FOR BRAKE DISC OF MOTOR VEHICLE HAVING EXCELLENT WEAR RESISTANCE AND HIGH TEMPERATURE STRENGTH AND METHOD OF MANUFACTURING THE SAME

(71) Applicant: POSCO, Pohang-si (KR)

(72) Inventors: Seng-Ho Yu, Pohang-si (KR); Young-Jin Jung, Pohang-si (KR); Kyung-Keun Um, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 686 days.

(21) Appl. No.: 17/415,389

(22) PCT Filed: Dec. 18, 2019

(86) PCT No.: PCT/KR2019/017987
§ 371 (c)(1),
(2) Date: Jun. 17, 2021

(87) PCT Pub. No.: WO2020/130619
PCT Pub. Date: Jun. 25, 2020

(65) Prior Publication Data
US 2022/0064769 A1   Mar. 3, 2022

(30) Foreign Application Priority Data

Dec. 19, 2018 (KR) .................. 10-2018-0165447

(51) Int. Cl.
| | | |
|---|---|---|
| C22C 38/54 | (2006.01) | |
| C21D 8/02 | (2006.01) | |
| C21D 9/46 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/42 | (2006.01) | |
| C22C 38/44 | (2006.01) | |
| C22C 38/46 | (2006.01) | |
| C22C 38/48 | (2006.01) | |
| C22C 38/50 | (2006.01) | |
| F16D 65/12 | (2006.01) | |

(52) U.S. Cl.
CPC ............ *C22C 38/54* (2013.01); *C21D 8/0205* (2013.01); *C21D 8/0226* (2013.01); *C21D 9/46* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *F16D 65/125* (2013.01)

(58) Field of Classification Search
None
See application file for complete search history.

(56) References Cited

U.S. PATENT DOCUMENTS

| | | |
|---|---|---|
| 6,245,290 B1 | 6/2001 | Koo et al. |
| 10,260,124 B2 | 4/2019 | Sakakibara et al. |
| 2006/0219335 A1 | 10/2006 | Arita |
| 2009/0277547 A1 | 11/2009 | Saito et al. |
| 2015/0329950 A1 | 11/2015 | Azuma et al. |
| 2019/0382866 A1 | 12/2019 | Yu et al. |
| 2019/0390293 A1 | 12/2019 | Yu et al. |
| 2020/0140981 A1 | 5/2020 | Kim et al. |
| 2020/0263279 A1 | 8/2020 | Um et al. |

FOREIGN PATENT DOCUMENTS

| | | |
|---|---|---|
| CN | 105970110 A | 9/2016 |
| CN | 108368594 A | 8/2018 |
| EP | 2612945 A1 | 7/2013 |
| JP | H10-237583 A | 9/1998 |
| JP | 2003-277883 A | 10/2003 |
| JP | 2004-300474 A | 10/2004 |
| JP | 2009-149922 A | 7/2009 |
| JP | 2016-117925 A | 6/2016 |
| JP | 2016-151061 A | 8/2016 |
| JP | 2018-059187 A | 4/2018 |
| KR | 10-2001-0029380 A | 4/2001 |

(Continued)

OTHER PUBLICATIONS

Chinese Office Action dated May 6, 2022 issued in Chinese Patent Application No. 201980084394.4 (with English translation).

(Continued)

*Primary Examiner* — Anthony M Liang
(74) *Attorney, Agent, or Firm* — Morgan, Lewis & Bockius LLP

(57) ABSTRACT

The present invention provides a steel material, and a method of manufacturing the same. The steel material comprises, by weight %, 0.02 to 0.07% of carbon, 0.1 to 0.5% of silicon, 0.2 to 0.7% of manganese, 0.05% or less of phosphorus, 0.02% or less of sulfur, 0.07% or less of aluminum, 0.1 to 0.5% of chromium, 0.3 to 1.0% of molybdenum, 0.05% or less of vanadium, 50 ppm or less of boron, 0.01 to 0.5% of nickel, 0.5% or less of copper, 0.02% or less of titanium, 0.05% or less of niobium, and 2 to 100 ppm of calcium, and the balance of Fe and other unavoidable impurities, and satisfies relational expressions 1 and 2 mentioned below, wherein the microstructure thereof contains, by area %, 90% or more of martensite and 10% or less of bainite.

$260 \leq 1589 \times [C] + 228 \leq 340$   [Relational Expression 1]

$[C]/[Mo] \leq 0.250$   [Relational Expression 2]

3 Claims, No Drawings

(56) References Cited

FOREIGN PATENT DOCUMENTS

| | | |
|---|---|---|
| KR | 10-0391944 B1 | 7/2003 |
| KR | 10-0506967 B1 | 8/2005 |
| KR | 10-1082680 B1 | 11/2011 |
| KR | 10-2012-0070603 A | 6/2012 |
| KR | 10-2012-0071614 A | 7/2012 |
| KR | 10-2013-0096213 A | 8/2013 |
| KR | 10-1709432 B1 | 3/2017 |
| KR | 10-2018-0073368 A | 7/2018 |
| KR | 10-2018-0073379 A | 7/2018 |
| WO | 2018/117676 A1 | 6/2018 |

OTHER PUBLICATIONS

Japanese Office Action dated Jul. 12, 2022 issued in Japanese Patent Application No. 2021-535700.
International Search Report and Written Opinion issued in corresponding International Application No. PCT/KR2019/017987 dated Apr. 1, 2020, with English translation.
Extended European Search Report dated Jan. 4, 2022 issued in European Patent Application No. 19898467.6.

STEEL MATERIAL FOR BRAKE DISC OF MOTOR VEHICLE HAVING EXCELLENT WEAR RESISTANCE AND HIGH TEMPERATURE STRENGTH AND METHOD OF MANUFACTURING THE SAME

CROSS REFERENCE

This application is the U.S. National Phase under 35 U.S.C. § 371 of International Application No. PCT/KR2019/017987 filed on 18 Dec. 2019, which claims the benefit of Korean Application No. 10-2018-0165447 filed on 19 Dec. 2018, the entire contents of each are hereby incorporated by reference.

TECHNICAL FIELD

The present disclosure relates to a steel material for a brake disc of a motor vehicle having excellent wear resistance and high temperature strength and a method of manufacturing the same.

BACKGROUND ART

Brake equipment of a motor vehicle is equipment used for decelerating or stopping a traveling car, and frictional force generated by bringing a rotating brake disc into contact with a pressing pad, which is a friction member, is used to release kinetic energy of a motor vehicle as heat energy to brake the motor vehicle. In order to decelerate or stop the speed of a brake disc rotating at a high speed, it is essential that the material of the brake disc have high wear resistance so as to withstand frictional force generated by contact with a pressing pad and strength is maintained at a high temperature of hundreds of degrees generated during friction.

In the automotive field in which fuel consumption reduction is a major issue, in recent years, an effort to reduce weight by increasing the strength of a chassis material to a giga level to decrease the thickness thereof has been consistently made. Meanwhile, a brake disc positioned below a motor vehicle has used a cast material described in Patent Document 1 for the previous decades, and studies for reducing the weight thereof and replacing the material with other metal materials are actively in progress mainly by car manufacturers. Among cast metal materials used as a brake disc material, a Duralcan composite material in which 20% of SiC is dispersed in an aluminum alloy is close to mass production, but there is currently almost no development of a brake disc for a motor vehicle utilizing a hot rolled steel material.

RELATED ART DOCUMENT (Patent Document 1) Korean Patent Registration No. 10-0391944

DISCLOSURE

Technical Problem

An aspect of the present disclosure is to provide a steel material for a brake disc having excellent wear resistance and high temperature strength and a method of manufacturing the same.

Technical Solution

According to an aspect of the present disclosure, a steel material for a brake disc of a motor vehicle having excellent wear resistance and high temperature strength includes, by weight: 0.02 to 0.07% of carbon (C), 0.1 to 0.5% of silicon (Si), 0.2 to 0.7% of manganese (Mn), 0.05% or less (excluding 0) of phosphorus (P), 0.02% or less (excluding 0) of sulfur (S), 0.07% or less (excluding 0) of aluminum (Al), 0.1 to 0.5% of chromium (Cr), 0.3 to 1.0% of molybdenum (Mo), 0.05% or less (excluding 0) of vanadium (V), 50 ppm or less (excluding 0) of boron (B), 0.01 to 0.5% of nickel (Ni), 0.5% or less (excluding 0) of copper (Cu), 0.02% or less (excluding 0) of titanium (Ti), 0.05% or less (excluding 0) of niobium (Nb), and 2 to 100 ppm of calcium (Ca), with a balance of Fe and other unavoidable impurities, wherein the steel material satisfies the following Relational Expressions 1 and 2, and a microstructure thereof includes, by area, 90% or more of martensite and 10% or less of bainite:

$$260 \leq 1589 \times [C] + 228 \leq 340 \quad \text{[Relational Expression 1]}$$

$$[C]/[Mo] \leq 0.250 \quad \text{[Relational Expression 2]}$$

wherein [C] and [Mo] are in % by weight.

According to another aspect of the present disclosure, a method of manufacturing a steel material for a brake disc of a motor vehicle having excellent wear resistance and high temperature strength includes: heating a steel slab in a temperature range of 1050 to 1250° C., the steel slab including, by weight: 0.02 to 0.07% of carbon (C), 0.1 to 0.5% of silicon (Si), 0.2 to 0.7% of manganese (Mn), 0.05% or less (excluding 0) of phosphorus (P), 0.02% or less (excluding 0) of sulfur(S), 0.07% or less (excluding 0) of aluminum (Al), 0.1 to 0.5% of chromium (Cr), 0.3 to 1.0% of molybdenum (Mo), 0.05% or less (excluding 0) of vanadium (V), 50 ppm or less (excluding 0) of boron (B), 0.01 to 0.5% of nickel (Ni), 0.5% or less (excluding 0) of copper (Cu), 0.02% or less (excluding 0) of titanium (Ti), 0.05% or less (excluding 0) of niobium (Nb), and 2 to 100 ppm of calcium (Ca), with a balance of Fe and other unavoidable impurities and satisfying the following Relational Expressions 1 and 2; roughly rolling the heated steel slab in a temperature range of 950 to 1050° C. to obtain a roughly rolled bar; subjecting the roughly rolled bar to finish hot rolling in a temperature range of 850 to 950° C. to obtain a hot rolled steel plate; air-cooling the hot rolled steel plate to room temperature and reheating the steel plate in a temperature range of 880 to 930° C. for a residual time of 1.3t+10 minutes (t: plate thickness (mm)) or more; and cooling the reheated hot rolled steel plate to 150° C. or lower at a cooling rate of 10° C./s or more:

$$260 \leq 1589 \times [C] + 228 \leq 340 \quad \text{[Relational Expression 1]}$$

$$[C]/[Mo] \leq 0.250 \quad \text{[Relational Expression 2]}$$

wherein [C] and [Mo] are in % by weight.

Advantageous Effects

As set forth above, according to an exemplary embodiment in the present disclosure, a steel material for a brake disc of a motor vehicle having a weight lighter by 10% or more and wear resistance improved by 20% or more as compared with a conventional casting material and also having excellent heat resistance, and a method of manufacturing the same may be provided.

BEST MODE FOR INVENTION

Hereinafter, an exemplary embodiment of the brake disc of a motor vehicle having excellent wear resistance and high temperature strength of the present disclosure will be described. First, an alloy composition of the present disclosure will be described. Contents of the alloy composition described below are in % by weight.

Carbon (C): 0.02 to 0.07%

Carbon (C) is effective for increasing strength and hardness of a steel having a martensite structure and an element effective for improving hardenability. For sufficiently securing the effect described above, it is preferable to add 0.02% or more of carbon, and when the content is more than 0.07%, it is difficult to satisfy Relational Expression 1 described later and also, weldability is inhibited. Therefore, it is preferable, in the present disclosure, that the content of C is controlled to 0.02 to 0.07%. The lower limit of the content of C is more preferably 0.023%, still more preferably 0.025%, and most preferably 0.030%. The upper limit of the content of C is more preferably 0.067%, still more preferably 0.065%, and most preferably 0.060%.

Silicon (Si): 0.1 to 0.5%

Silicon (Si) is an element effective for improving strength due to deoxidation and solid solution strengthening. For effectively obtaining the effect, it is preferable to add 0.1% or more of silicon. However, when the content is more than 0.5%, excessive scale is produced during hot rolling and also the weldability of a final product is deteriorated, which is thus not preferable. Therefore, it is preferable, in the present disclosure, that the content of Si is controlled to 0.1 to 0.5%. The lower limit of the content of Si is more preferably 0.012%, still more preferably 0.015%, and most preferably 0.20%. The upper limit of the content of Si is more preferably 0.48%, still more preferably 0.45%, and most preferably 0.40%.

Manganese (Mn): 0.2 to 0.7%

Manganese (Mn) suppresses production of ferrite and lowers an Ar3 temperature, thereby effectively increasing quenching properties to improve strength and toughness of steel. For effectively obtaining the effect, it is preferable to add 0.2% or more of silicon. However, when the content of Mn is more than 0.7%, weldability is decreased. Therefore, it is preferable, in the present disclosure, that the content of Mn is controlled to 0.7% or less. The lower limit of the content of Mn is more preferably 0.23%, still more preferably 0.25%, and most preferably 0.30%. The upper limit of the content of Mn is more preferably 0.68%, still more preferably 0.63%, and most preferably 0.60%.

Phosphorus (P): 0.05% or less (excluding 0%)

Phosphorus (P) is an element which is inevitably contained in steel and inhibits toughness of steel. Therefore, it is preferable to lower the content of P as much as possible to 0.05% or less, but considering an inevitably contained level, 0% is excluded.

Sulfur (S): 0.02% or less (excluding 0%)

Sulfur (S) is an element which forms a MnS inclusion in steel to inhibit toughness of steel. Therefore, it is preferable to lower the content of S as much as possible to 0.02% or less, but considering an inevitably contained level, 0% is excluded.

Aluminum (Al): 0.07% or less (excluding 0%)

Aluminum (Al), which is a deoxidizer, is an element effective for lowering the content of oxygen in molten steel. However, when the content of Al is more than 0.07%, cleanliness of steel is inhibited, which is thus not preferable. Therefore, it is preferable, in the present disclosure, to control the content of Al to 0.07% or less, and considering a load during a steel making process, an increase in manufacturing costs, and the like, 0% is excluded. Therefore, it is preferable that the content of Al is 0.07% or less (excluding 0%). The content of Al is more preferably 0.060 or less, still more preferably 0.05% or less, and most preferably 0.04% or less.

Chromium (Cr): 0.1 to 0.5%

Chromium (Cr) is an element increasing quenching properties to increase strength of steel and is advantageous for securing hardness. For the effect described above, it is preferable to add 0.1% or more Cr, but when the content is more than 0.5%, weldability is deteriorated to cause an increase in manufacturing costs. Therefore, it is preferable, in the present disclosure, to control the content of Cr to 0.1 to 0.5%. The lower limit of the content of Cr is more preferably 0.12%, still more preferably 0.15%, and most preferably 0.20%. The upper limit of the content of Cr is more preferably 0.47%, still more preferably 0.45%, and most preferably 0.40%.

Molybdenum (Mo): 0.3 to 1.0%

Molybdenum (Mo) increases the quenching properties of steel, and is an element which is very useful for securing high temperature strength by forming a fine carbide ($Mo_2C$) at high temperature. For sufficiently obtaining the effect described above, it is preferable to add 0.3% or more Mo. However, when the content of Mo, which is a rather expensive element, is more than 1.0%, manufacturing costs increase, and also, weldability is deteriorated. Therefore, it is preferable, in the present disclosure, to control the content of Mo to 0.3 to 1.0%. The lower limit of the content of Mo is more preferably 0.35%, and still more preferably 0.4%. The upper limit of the content of Mo is more preferably 0.9%, and still more preferably 0.8%.

Vanadium (V): 0.05% or less (excluding 0%)

Vanadium (V) is an element which is advantageous for suppressing growth of austenite crystal grains by forming a VC carbide during reheating after hot rolling and improving the quenching properties of steel to secure strength and toughness. However, when the content of V, which is an expensive element, is more than 0.05%, manufacturing costs are increased. Therefore, in the present disclosure, when V is added, it is preferable to control the content to 0.05% or less. Therefore, it is preferable that the content of V is 0.05% or less (excluding 0%). The content of V is more preferably 0.045% or less, still more preferably 0.040% or less, and most preferably 0.035% or less.

Boron (B): 50 ppm or less (excluding 0%)

Boron (B) is an element for effectively increasing the quenching properties of steel even with a small addition amount to improve strength. However, when the content is excessive, toughness and weldability of steel is rather inhibited, and thus, it is preferable to control the content to 50 ppm or less. Therefore, it is preferable that the content of B is 50 ppm or less (excluding 0%). The content of B is more preferably 40 ppm or less, still more preferably 35 ppm or less, and most preferably 30 ppm or less.

Nickel (Ni): 0.01 to 0.5%

Nickel (Ni) is generally an element effective for improving toughness, together with strength of steel. For the effect described above, it is preferable to add 0.01% or more Ni, but Ni is an expensive element and when the content is more than 0.5%, manufacturing costs are increased. Therefore, it is preferable, in the present disclosure, to control the content of Ni to 0.01 to 0.5%. The lower limit of the content of Ni is more preferably 0.05%, still more preferably 0.07%, and most preferably 0.1%. The upper limit of the content of Ni is more preferably 0.47%, still more preferably 0.45%, and most preferably 0.4%.

Copper (Cu): 0.5% or less (excluding 0%)

Copper (Cu) is an element which improves strength and hardness of steel by solid solution strengthening. In addition, it is an element effective for improving toughness together with Ni. However, when the content of Cu is more than 0.5%, surface defects of slab occur during heating at high temperature before hot rolling and hot processability is inhibited, and thus, when Cu is added, it is preferable to add 0.5% or less Cu. Therefore, it is preferable that the content of Cu is 0.5% or less (excluding 0%). The content of Cu is more preferably 0.4% or less, still more preferably 0.35% or less, and most preferably 0.3% or less.

Titanium (Ti): 0.02% or less (excluding 0%)

Titanium (Ti) is an element maximizing the effect of B which is an element effective for improving the quenching properties of steel. Specifically, Ti is bonded to nitrogen (N) to form a TiN precipitate to suppress formation of BN, thereby increasing solid solubilized B to maximize improvement of quenching properties. However, when the content of Ti is more than 0.02%, a coarse TiN precipitate is formed to deteriorate toughness of steel. Therefore, it is preferable, in the present disclosure, to control the content of Ti to 0.02% or less. The content of Ti is more preferably 0.019% or less, still more preferably 0.018% or less, and most preferably 0.017% or less.

Niobium (Nb): 0.05% or less (excluding 0%)

Niobium (Nb) is solid-solubilized in austenite to increase the hardenability of austenite and forms carbonitrides such as Nb(C,N) to be effective for suppressing an increase in steel strength and growth of austenite crystal grains. However, when the content of Nb is more than 0.05%, coarse precipitates are formed, which is problematic in being a starting point of brittle fracture to inhibit toughness. Therefore, it is preferable, in the present disclosure, to control the content of Nb to 0.05% or less. The content of Nb is more preferably 0.045% or less, still more preferably 0.04% or less, and most preferably 0.03% or less.

Calcium (Ca): 2 to 100 ppm

Calcium (Ca) has excellent binding force to S to have an effect of producing CaS, thereby suppressing production of MnS segregated in the center of a steel thickness. In addition, CaS produced by addition of Ca has an effect of increasing corrosion resistance under a humid external environment. For the effects described above, it is preferable to add 2 ppm or more Ca, but when the content is more than 100 ppm, nozzle clogging and the like are caused in steel making operation. Therefore, it is preferable, in the present disclosure, to control the content of Ca to 2 to 100 ppm. The lower limit of the content of Ca is more preferably 2.5 ppm, still more preferably 3 ppm, and most preferably 3.5 ppm. The upper limit of the content of Ca is more preferably 80 ppm, still more preferably 60 ppm, and most preferably 40 ppm.

The remaining component of the present disclosure is iron (Fe). However, since in the common manufacturing process, unintended impurities may be inevitably incorporated from raw materials or the surrounding environment, they may not be excluded. Since these impurities are known to any person skilled in the common manufacturing process, the entire contents thereof are not particularly mentioned in the present specification.

In addition, it is preferable that the steel material of the present disclosure satisfies the following Relational Expression 1. The following Relational Expression 1 is for increasing a surface hardness as compared with conventional cast metal materials to decrease a thickness of the brake disc, resulting in securing a weight lightening effect. When the value of the following Relational Expression 1 is less than 260, a hardness increase degree relative to the conventional cast metal materials is insignificant to have an effect of less thickness reduction (lighter weight), and when the value is more than 340, frictional force with a brake pad is excessively high when braking due to an excessively high hardness to shorten a use life of the pad. Therefore, it is preferable that the value of the following Relational Expression 1 is in a range of 260 to 340. The lower limit of the value of the following Relational Expression 1 is more preferably 265, still more preferably 270, and most preferably 275. The upper limit of the value of the following Relational Expression 1 is more preferably 335, still more preferably 330, and most preferably 325.

$$260 \leq 1589 \times [C] + 228 \leq 340 \qquad \text{[Relational Expression 1]}$$

wherein [C] is in % by weight.

In addition, it is preferable that the steel material of the present disclosure satisfies the following Relational Expression 2. The following Relational Expression 2 is for securing both excellent hardness and high temperature strength. When the value of the following Relational Expression 2 is more than 0.250, the strength of the material is significantly decreased under a high temperature environment in which the brake system of a motor vehicle is operated even in the case in which the surface hardness of 260 to 340 HB, which is a target level of the present disclosure, is secured, and as a result, sufficient braking performance may not be guaranteed. Therefore, it is preferable that the value of the following Relational Expression 2 is 0.250 or less. The value of the following Relational Expression 2 is more preferably 0.230 or less, still more preferably 0.200 or less, and most preferably 0.150 or less.

$$[C]/[Mo] \leq 0.250 \qquad \text{[Relational Expression 2]}$$

wherein [C] and [Mo] are in % by weight.

In addition, it is preferable that the steel material of the present disclosure has a microstructure including martensite as a main structure. Thus, the steel material of the present disclosure may secure excellent hardness. Theoretically, it is most preferable that a fraction of the martensite structure is 100%, but a bainite structure may be inevitably formed during a manufacturing operation, and in the present disclosure, the upper limit of the fraction of the bainite structure is controlled to 10%. That is, it is preferable that the microstructure of the present disclosure has, by area, a microstructure including 90% or more martensite and 10% or less bainite. When the fraction of martensite is less than 90% by area, it is difficult to secure a hardness in a target level. The fraction of martensite is more preferably 92% by area or more, and still more preferably 95% by area or more. The fraction of bainite is more preferably 8% by area or less, and still more preferably 5% by area or less.

The steel material of the present disclosure provided as described above may have a Brinell hardness of 260 to 340 HB. When the Brinell hardness is less than 260, a hardness increase degree relative to the conventional cast metal materials is insignificant to have an effect of less thickness reduction (lighter weight), and when the Brinell hardness is more than 340, frictional force with a brake pad is excessively high when braking due to an excessively high hardness to shorten a use life of the pad. Therefore, it is preferable that the Brinell hardness is in a range of 260 to 340 HB. The lower limit of the Brinell hardness is more preferably 265 HB, still more preferably 270 HB, and most preferably 275 HB. The upper limit of the Brinell hardness is more preferably 335 HB, still more preferably 330 HB, and most preferably 325 HB.

In addition, the steel material of the present disclosure may have a yield strength at 600° C. of 300 MPa or more, and when the steel material securing excellent strength at high temperature is applied to a brake disc, it contributes to lighter weight and an increase in product life.

The steel material of the present disclosure having excellent hardness and high temperature yield strength as described above has a weight lighter by 10% or more and wear resistance improved by 20% or more as compared with conventional cast metal materials and also has excellent heat resistance.

In addition, the steel material of the present disclosure may have a thickness of 20 mm or less, thereby exhibiting an excellent lighter weight effect as compared with the conventional cast metal materials.

Hereinafter, an exemplary embodiment of the method of manufacturing a steel material for a brake disc of a motor vehicle having excellent wear resistance and high temperature strength of the present disclosure will be described.

First, a steel slab having an alloy composition described above and satisfying Relational Expressions 1 and 2 is heated in a temperature range of 1050 to 1250° C. When the slab heating temperature is lower than 1050° C., re-solid solubilization of Nb or the like is not sufficient, but when the slab heating temperature is higher than 1250° C., austenite crystal grains are coarsened to form a non-uniform structure. Therefore, it is preferable, in the present disclosure, that the heating temperature of the steel slab is in a range of 1050 to 1250° C. The lower limit of the heating temperature of the steel slab is more preferably 1065° C., still more preferably 1080° C., and most preferably 1100° C. The upper limit of the heating temperature of the steel slab is more preferably 1220° C., still more preferably 1200° C., and most preferably 1180° C.

The heated steel slab is roughly rolled in a range of 950 to 1050° C. to obtain a roughly rolled bar. When the temperature is lower than 950° C. during the rough rolling, a rolling load is increased so that the steel slab is relatively weakly reduced not to sufficiently deliver deformation to the center in the thickness direction of the slab, and thus, defects such as pores may not be removed. However, when the temperature is higher than 1050° C., recrystallization occurs at the same time as rolling and then particles grow, and thus, initial austenite particles may be excessively coarsened. Therefore, it is preferable, in the present disclosure, that the rough rolling temperature is 950 to 1050° C. The lower limit of the rough rolling temperature is more preferably 960° C., still more preferably 970° C., and most preferably 980° C. The upper limit of the rough rolling temperature is more preferably 1045° C., still more preferably 1040° C., and most preferably 1035° C.

The roughly rolled bar is subjected to finish hot rolling in a temperature range of 850 to 950° C. to obtain a hot rolled steel plate. When the finish hot rolling temperature is lower than 850° C., two-phase region is rolled so that ferrite may be produced in the microstructure; however, when the temperature is higher than 950° C., bainite may be excessively produced due to a relatively high cooling rate even during air cooling. Therefore, it is preferable, in the present disclosure, that the finish hot rolling temperature is 850 to 950° C. The lower limit of the finish hot rolling temperature is more preferably 860° C., still more preferably 870° C., and most preferably 880° C. The upper limit of the finish hot rolling temperature is more preferably 940° C., still more preferably 930° C., and most preferably 920° C.

Thereafter, the hot rolled steel plate is air-cooled to room temperature, and is reheated in a temperature range of 880 to 930° C. for a residual time of 1.3t+10 minutes (t: Plate thickness (mm)) or more. The reheating is for reverse-transforming the hot rolled steel plate formed of ferrite and pearlite into an austenite single phase, and when the reheating temperature is lower than 880° C. or less, austenization is not sufficiently performed so that coarse soft ferrite is mixed therein to decrease the hardness of a final product. However, when the temperature is higher than 930° C., austenite crystal grains are coarsened to increase quenching properties, but it is disadvantageous in terms of thermal efficiency in mass production. Therefore, it is preferable that the reheating temperature is in a range of 880 to 930° C. The lower limit of the reheating temperature is more preferably 885° C., still more preferably 890° C., and most preferably 895° C. The upper limit of the reheating temperature is more preferably 925° C., still more preferably 920° C., and most preferably 915° C. Meanwhile, when the residual time in the reheating is less than 1.3t+10 minutes (t: plate thickness (mm)), austenization is not sufficiently performed, so that phase transformation by subsequent rapid cooling, that is, a martensite structure may not be sufficiently obtained. Therefore, the residual time in the reheating may be 1.3t+10 minutes (t: plate thickness (mm)) or more. The residual time in the reheating may be more preferably 1.3t+12 minutes (t: plate thickness (mm)) or more, still more preferably 1.3t+13 minutes (t: plate thickness (mm)) or more, and most preferably 1.3t+15 minutes (t: plate thickness (mm)) or more. Meanwhile, in the present disclosure, the upper limit of the residual time in the reheating is not particularly limited. However, when the residual time in the reheating is more than 1.3t+60 minutes (t: plate thickness (mm)), austenite crystal grains are coarsened to increase quenching properties, but productivity may be relatively low. Therefore, it is preferable that the residual time in the reheating may be 1.3t+60 minutes (t: plate thickness (mm)) or less. The residual time in the reheating may be more preferably 1.3t+50 minutes (t: plate thickness (mm)) or less, still more preferably 1.3t+40 minutes (t: plate thickness (mm)) or less, and most preferably 1.3t+30 minutes (t: plate thickness (mm)) or less.

Thereafter, the reheated hot rolled steel plate is cooled to 150° C. or lower at a cooling rate of 10° C./s or more, based on a plate thickness center (for example, a ½t point (t: plate thickness (mm)). Here, it is preferable that the cooling is rapid cooling by water cooling. When the cooling rate is less than 10° C./s or a cooling end temperature is higher than 150° C., a ferrite phase may be formed during cooling or a bainite phase may be excessively formed. Therefore, it is preferable that the cooling is performed to 150° C. or lower at a cooling rate of 10° C./s or more. The cooling rate may be more preferably 12° C./s or more, still more preferably 15° C./s or more, and most preferably 20° C./s or more. Since a faster cooling rate is advantageous for microstructure formation to be obtained in the present disclosure, the upper limit of the cooling rate is not particularly limited in the present disclosure, and may be appropriately set by a person skilled in the art considering facility limitation. The cooling end temperature is more preferably 125° C. or lower, more preferably 100° C. or lower, and most preferably 50° C. or lower.

MODE FOR INVENTION

Hereinafter, the present disclosure will be described in detail through the following examples. However, it should be noted that the following examples are only for describing the present disclosure in detail by illustration, and are not intended to limit the rights scope of the present disclosure. The reason is that the rights scope of the present disclosure is determined by the matters described in the claims and able to be reasonably inferred therefrom.

EXAMPLE

A steel slab having the alloy composition of the following Tables 1 and 2 was prepared, and the steel slab was subjected to steel slab heating-rough rolling-hot rolling-cooling (room temperature)-reheating-rapid cooling under the conditions of the following Table 3 to produce a hot rolled steel plate. The microstructure and the mechanical physical properties of the hot rolled steel plate were measured, and are shown in the following Table 4. Meanwhile, the conventional example was produced by pouring a molten metal into a die and cooling the molten metal at a cooling rate of about 1° C./s.

Here, a specimen was cut to an arbitrary size to manufacture a mirror surface and was corroded using a nital etching solution, and then the microstructure was observed at a ½t position which was a thickness center using an optical microscope and a scanning electron microscope.

Hardness and high temperature strength were measured using a Brinell hardness tester (load 3000 kgf, 10 mm tungsten press inlet) and a high temperature tensile tester, respectively. Here, the hardness was obtained by subjecting a plate surface to 2 mm milling processing and, performing measurement three times, and using an average value. In addition, the high temperature tensile test value was obtained by mounting a tensile specimen in a chamber for an exclusive use, heating the specimen to 600° C. at 10° C./min, performing measurement twice in a state of holding for 5 minutes, and using an average value.

TABLE 1

| Classification | Alloy composition (wt %) | | | | | | | | |
|---|---|---|---|---|---|---|---|---|---|
| | C | Si | Mn | P | S | Al | Cr | Ni | Mo |
| Comparative steel 1 | 0.123 | 0.35 | 1.42 | 0.011 | 0.002 | 0.03 | 0.51 | 0.04 | 0.25 |
| Comparative steel 2 | 0.017 | 0.15 | 0.9 | 0.015 | 0.003 | 0.03 | 0.02 | 0.01 | 0.12 |
| Comparative steel 3 | 0.056 | 0.25 | 0.65 | 0.012 | 0.001 | 0.02 | 0.32 | 0.72 | 0.01 |
| Inventive steel 1 | 0.068 | 0.32 | 0.46 | 0.011 | 0.002 | 0.02 | 0.23 | 0.01 | 0.53 |
| Inventive steel 2 | 0.023 | 0.28 | 0.60 | 0.012 | 0.001 | 0.03 | 0.45 | 0.37 | 0.41 |
| Inventive steel 3 | 0.048 | 0.31 | 0.53 | 0.009 | 0.003 | 0.02 | 0.16 | 0.01 | 0.69 |
| Conventional steel | 3.105 | 1.65 | 1.32 | 0.096 | 0.095 | — | — | — | — |

TABLE 2

| Classification | Alloy composition (wt %) | | | | | | Relational Expression 1 | Relational Expression 2 |
|---|---|---|---|---|---|---|---|---|
| | B | Cu | Ti | Nb | V | Ca | | |
| Comparative steel 1 | 0.0017 | 0.01 | 0.018 | 0.005 | 0.05 | 0.0005 | 389.5 | 0.492 |
| Comparative steel 2 | 0.0002 | 0.01 | 0.001 | 0.001 | 0.01 | 0.0002 | 246.0 | 0.142 |
| Comparative steel 3 | 0.0020 | 0.21 | 0.017 | 0.015 | 0.01 | 0.0009 | 298.8 | 5.600 |
| Inventive steel 1 | 0.0013 | 0.03 | 0.020 | 0.013 | 0.02 | 0.0004 | 315.1 | 0.128 |
| Inventive steel 2 | 0.0015 | 0.02 | 0.016 | 0.014 | 0.01 | 0.0006 | 254.1 | 0.056 |
| Inventive steel 3 | 0.0018 | 0.02 | 0.012 | 0.012 | 0.04 | 0.0007 | 288.0 | 0.070 |
| Conventional steel | — | — | — | — | — | — | 5161.8 | — |

[Relational Expression 1] 1589 × [C] + 228

[Relational Expression 2] [C]/[Mo]

TABLE 3

| Classification | Steel grade No. | Slab heating temperature: (° C.) | Rough rolling temperature (° C.) | Finish hot rolling temperature (° C.) | Reheating temperature (° C.) | Reheating residual time (min) | Cooling rate (° C./s) | Cooling end temperature (° C.) | Thickness (mm) |
|---|---|---|---|---|---|---|---|---|---|
| Comparative Example 1 | Comparative steel 1 | 1165 | 1023 | 871 | 911 | 36 | 57 | 28 | 12 |
| Comparative Example 2 | | 1157 | 1035 | 890 | 910 | 35 | 48 | 113 | 15 |
| Comparative Example 3 | | 1158 | 1034 | 915 | 921 | 45 | 47 | 23 | 20 |
| Comparative Example 4 | Comparative steel 2 | 1126 | 1043 | 923 | 906 | 43 | 49 | 22 | 20 |
| Comparative Example 5 | | 1134 | 1010 | 872 | 916 | 32 | 53 | 25 | 15 |
| Comparative Example 6 | | 1145 | 989 | 886 | 915 | 35 | 56 | 43 | 15 |
| Comparative Example 7 | Comparative steel 3 | 1146 | 1041 | 864 | 920 | 27 | 65 | 27 | 10 |
| Comparative Example 8 | | 1154 | 1032 | 920 | 924 | 43 | 61 | 211 | 15 |
| Comparative Example 9 | | 1160 | 1060 | 938 | 927 | 51 | 58 | 32 | 20 |
| Inventive Example 1 | Inventive steel 1 | 1154 | 1021 | 911 | 916 | 41 | 55 | 23 | 16 |
| Comparative Example 10 | | 1150 | 1027 | 899 | 867 | 70 | 58 | 29 | 16 |
| Inventive Example 2 | | 1129 | 1034 | 823 | 921 | 38 | 51 | 22 | 20 |
| Comparative Example 11 | Inventive steel 2 | 1141 | 1030 | 884 | 909 | 16 | 60 | 44 | 12 |
| Inventive Example 3 | | 1124 | 1016 | 901 | 911 | 37 | 55 | 21 | 15 |
| Inventive Example 4 | | 1135 | 1021 | 917 | 906 | 43 | 57 | 20 | 16 |
| Inventive Example 5 | Inventive steel 3 | 1146 | 1024 | 879 | 910 | 32 | 59 | 38 | 12 |
| Inventive Example 6 | | 1151 | 1036 | 932 | 908 | 50 | 47 | 30 | 15 |
| Comparative Example 12 | | 1121 | 1029 | 928 | 912 | 37 | 56 | 336 | 15 |
| Conventional example | Conventional steel | — | — | — | — | — | — | — | — |

TABLE 4

| Classification | Microstructure (% by area) M | Microstructure (% by area) Others | Surface hardness (HB) | Yield strength (MPa, @600° C.) |
|---|---|---|---|---|
| Comparative Example 1 | 99 | B: 1 | 401 | 247 |
| Comparative Example 2 | 96 | B: 4 | 387 | 232 |
| Comparative Example 3 | 98 | B: 2 | 405 | 252 |
| Comparative Example 4 | 98 | B: 2 | 223 | 121 |
| Comparative Example 5 | 99 | B: 1 | 245 | 109 |
| Comparative Example 6 | 99 | B: 1 | 239 | 114 |
| Comparative Example 7 | 99 | B: 1 | 302 | 126 |
| Comparative Example 8 | 84 | B: 16 | 229 | 113 |
| Comparative Example 9 | 97 | B: 3 | 295 | 120 |
| Inventive Example 1 | 98 | B: 2 | 305 | 331 |
| Comparative Example 10 | 67 | B: 25, AF: 8 | 234 | 348 |
| Inventive Example 2 | 99 | B: 1 | 311 | 347 |
| Comparative Example 11 | 87 | B: 11, AF: 2 | 221 | 321 |
| Inventive Example 3 | 98 | B: 2 | 260 | 319 |
| Inventive Example 4 | 97 | B: 3 | 252 | 330 |
| Inventive Example 5 | 99 | B: 1 | 285 | 402 |
| Inventive Example 6 | 99 | B: 1 | 292 | 375 |
| Comparative Example 12 | 76 | B: 24 | 208 | 363 |
| Conventional example | — | P: 100 | 204 | 160 |

M: martensite,
B: bainite,
AF: acicular ferrite,
P: pearlite

As shown in the above Tables 1 to 4, it is seen that Inventive Examples 1 to 6 in which the alloy composition, Relational Expressions 1 and 2, and the manufacturing conditions suggested in the present disclosure were satisfied not only satisfied the microstructure fraction of the present disclosure but also secured excellent hardness and high temperature yield strength.

However, it is seen that Comparative Examples 1 to 9 in which most of the manufacturing conditions suggested in the present disclosure were satisfied but the alloy composition, Relational Expression 1, or Relational Expression 2 were not satisfied did not reach levels of hardness and high temperature yield strength to be targeted in the present disclosure.

It is seen that Comparative Example 10 in which the alloy composition and Relational Expressions 1 and 2 suggested in the present disclosure were satisfied, but the reheating temperature among the manufacturing conditions was not satisfied did not secure the type and fraction of the microstructure suggested in the present disclosure, and also had a low level of surface hardness.

It is seen that Comparative Example 11 in which the alloy composition and Relational Expressions 1 and 2 suggested in the present disclosure were satisfied, but the reheating residual time among the manufacturing conditions was not satisfied did not secure the type and fraction of the microstructure suggested in the present disclosure, and also had a low level of surface hardness.

It is seen that Comparative Example 12 in which the alloy composition and Relational Expressions 1 and 2 suggested in the present disclosure were satisfied, but the cooling rate among the manufacturing conditions was not satisfied did not secure the martensite fraction suggested in the present disclosure, and thus, had a low level of surface hardness.

Meanwhile, it is seen that the conventional example which was the conventional casting metal material had a pearlite structure, a surface hardness of 204 HB, and a yield strength at 600° C. of 160 MPa, which are in a low level as compared with the inventive examples.

The invention claimed is:

1. A steel material for a brake disc of a motor vehicle, the steel material comprising, by weight: 0.02 to 0.07% of carbon (C), 0.1 to 0.5% of silicon (Si), 0.2 to 0.7% of manganese (Mn), 0.05% or less (excluding 0) of phosphorus (P), 0.02% or less (excluding 0) of sulfur(S), 0.07% or less (excluding 0) of aluminum (Al), 0.1 to 0.5% of chromium (Cr), 0.3 to 1.0% of molybdenum (Mo), 0.05% or less (excluding 0) of vanadium (V), 50 ppm or less (excluding 0) of boron (B), 0.01 to 0.5% of nickel (Ni), 0.5% or less (excluding 0) of copper (Cu), 0.02% or less (excluding 0) of titanium (Ti), 0.05% or less (excluding 0) of niobium (Nb), and 2 to 100 ppm of calcium (Ca), with a balance of Fe and unavoidable impurities,
wherein the steel material has a Brinell hardness of 260 to 340 HB, the steel material satisfies the following Relational Expressions 1 and 2, and a microstructure includes, by area, 90% or more martensite and 10% or less of bainite:

$260 \leq 1589 \times [C] + 228 \leq 340$     [Relational Expression 1]

$[C]/[Mo] \leq 0.250$     [Relational Expression 2]

wherein [C] and [Mo] are in % by weight.

2. The steel material of claim 1, wherein the steel material has a yield strength at 600° C. of 300 MPa or more.

3. A method of manufacturing the steel material of claim 1, the method comprising:
heating a steel slab in a temperature range of 1050 to 1250° C., the steel slab including, by weight: 0.02 to 0.07% of carbon (C), 0.1 to 0.5% of silicon (Si), 0.2 to 0.7% of manganese (Mn), 0.05% or less (excluding 0) of phosphorus (P), 0.02% or less (excluding 0) of sulfur(S), 0.07% or less (excluding 0) of aluminum (Al), 0.1 to 0.5% of chromium (Cr), 0.3 to 1.0% of molybdenum (Mo), 0.05% or less (excluding 0) of vanadium (V), 50 ppm or less (excluding 0) of boron (B), 0.01 to 0.5% of nickel (Ni), 0.5% or less (excluding 0) of copper (Cu), 0.02% or less (excluding 0) of titanium (Ti), 0.05% or less (excluding 0) of niobium (Nb), and 2 to 100 ppm of calcium (Ca), with a balance of Fe and other unavoidable impurities and satisfying the following Relational Expressions 1 and 2;
roughly rolling the heated steel slab in a temperature range of 950 to 1050° C. to obtain a roughly rolled bar;
subjecting the roughly rolled bar to finish hot rolling in a temperature range of 850 to 950° C. to obtain a hot rolled steel plate;
air-cooling the hot rolled steel plate to room temperature, and reheating the steel plate in a temperature range of 880 to 930° C. for a residual time 1.3t+10 minutes (t: plate thickness (mm)) or more; and
cooling the reheated hot rolled steel plate to 150° C. or lower at a cooling rate of 10° C./s or more:

$260 \leq 1589 \times [C] + 228 \leq 340$     [Relational Expression 1]

$[C]/[Mo] \leq 0.250$     [Relational Expression 2]

wherein [C] and [Mo] are in % by weight.

* * * * *